United States Patent
Fulks et al.

[11] Patent Number: 6,164,183
[45] Date of Patent: Dec. 26, 2000

[54] BRAKE BOOSTER WITH ALTERNATE ACTIVATION BY ROTARY ELECTRIC MOTOR

[75] Inventors: Gary Chris Fulks, Dayton; Donald Lee Parker, Middletown; James William Zehnder II, Huber Heights, all of Ohio

[73] Assignee: Delphi Technologies, Inc., Troy, Mich.

[21] Appl. No.: 09/247,268

[22] Filed: Feb. 10, 1999

[51] Int. Cl.[7] .................................. F15B 9/03; F15B 9/10
[52] U.S. Cl. ............................................ 91/367; 91/376 R
[58] Field of Search ................................ 91/367, 376 R, 91/380

[56] References Cited

U.S. PATENT DOCUMENTS

| | | | |
|---|---|---|---|
| 5,350,224 | 9/1994 | Nell et al. | 91/376 R |
| 5,460,074 | 10/1995 | Balz et al. | 91/376 R |
| 5,483,866 | 1/1996 | Schluter . | |
| 5,484,193 | 1/1996 | Fuller et al. | 60/545 |
| 5,493,946 | 2/1996 | Schluter . | |
| 5,746,057 | 5/1998 | Shim . | |

FOREIGN PATENT DOCUMENTS

| | | |
|---|---|---|
| 4234043 | 3/1994 | Germany . |
| 19802847 | 8/1999 | Germany . |
| 19841879 | 8/1999 | Germany . |

*Primary Examiner*—F. Daniel Lopez
*Attorney, Agent, or Firm*—Robert M. Sigler

[57] ABSTRACT

A vacuum booster for a vehicle brake system provides a working pressure valve seat on a valve member axially movable with respect to an input member. A rotary electric motor within the booster has an output shaft coupled through rotary to linear motion conversion apparatus to move the valve member with its working pressure valve seat relative to the input member. The combination of elements is designed as a drop-in replacement for a standard air valve member. The motion conversion apparatus provides much greater mechanical force than a linear solenoid; and this allows a more straightforward design of the valve arrangement, particularly the use of a high friction seal such as a simple "O"-ring in a groove. In further contrast to a linear solenoid, it further provides positive control of the working pressure valve seat position and an extended range of travel with constant force throughout the range. A magnet may be mounted on the nut adjacent a stationary magnetic sensor mounted on a circuit board associated with the motor to provide a signal of the position of the nut for the accurate positioning of the working fluid valve seat. A retaining clip normally used to prevent axial withdrawal of the input member from the power piston may be advantageously used to circumferentially engage an extension of a portion of the input member to prevent its rotation.

6 Claims, 4 Drawing Sheets

BRAKE BOOSTER WITH ALTERNATE ACTIVATION BY ROTARY ELECTRIC MOTOR

TECHNICAL FIELD

The field of this invention is a vacuum booster for a hydraulic brake apparatus having alternate electrical booster activation.

BACKGROUND OF THE INVENTION

Vacuum boosters are commonly used to provide power braking assist for vehicle operators in brake apply. Such boosters use a differential pressure actuator to boost the driver exerted force on a brake pedal or similar brake input device. The differential pressure actuator works from a source of low pressure fluid, such as a vacuum line from the engine intake manifold and a source of relatively higher pressure: the atmosphere. These two fluid pressure sources are controlled in a standard double valve arrangement involving a power piston connected to the differential pressure actuator output member and carrying a low pressure valve seat, an air valve responsive to brake input and carrying a working pressure valve seat, and a floating valve member engagable with either of the valve seats and always in contact with at least one.

It has further been disclosed to provide in alternate activation capability in such a booster with electrical activation by a linear electric solenoid acting within the booster. Such alternate activation provides the capability for automatic power brake activation independent of vehicle operator input. However, the linear solenoid designs tend to be large, heavy and expensive to manufacture, due to the generally low forces generated by linear solenoids. Not only must the solenoid itself be of significant size, but the seal or seals between members, one of which is moved by the solenoid with respect to the other, must be of a low friction design. In addition, a linear solenoid is an inherently non-linear device with a short effective range. The magnetic force exerted by the coil on the armature is strongest when they are together and falls off rapidly as they are separate. This significantly limits the effective range of the arrangement. Also, a linear solenoid is inherently a two position device. Although pulse width modulation of the activating current can produce an approximately continuous output, it is only an approximation. More precise control in electrical activation would be desirable.

SUMMARY OF THE INVENTION

The booster of this invention overcomes some of the problems of linear activated solenoids in providing alternate booster activation in response to an electric input by using a rotary electric motor to move the working pressure valve seat relative to the air valve. The output shaft of the motor is provided with rotary to linear motion conversion apparatus to effect axial movement of one of the valve members in the booster so as to permit activation of the booster in response to electrical operation of the motor. The rotary electric motor, together with the rotary to linear motion conversion apparatus, is capable of providing much greater mechanical force than a linear solenoid; and this allows a more straightforward design of the valve arrangement, especially the seals. In addition, the rotary electric motor and its output conversion apparatus provides an essentially constant force during its activation; and a long travel is thus easily obtained. The rotary electric motor and its output motion conversion apparatus is also capable of precise control of the working pressure valve seat relative to the air valve. The resulting booster is lighter and less expensive to manufacture, with more precise control in operation.

The rotary to linear motion conversion apparatus preferably comprises a screw on the output shaft of the rotary electric motor, an axial nut engaged with the screw for axial movement with rotation of the screw and a radial drive pin engaging the nut with the valve member for mutual axial motion. This positive drive arrangement provides positive control of the working pressure valve seat position and mechanical advantage throughout the range of travel. A magnet may be mounted on the nut adjacent a stationary magnetic sensor mounted on a circuit board associated with the motor to provide a signal of the position of the nut, and therefore of the working pressure valve seat, relative to the air valve. Such a signal assists in ensuring the accurate positioning of the working fluid valve seat and in applying a predetermined braking force. A retaining clip normally used to prevent axial withdrawal of the air valve from the power piston may be advantageously used to circumferentially engage an extension of a portion of the air valve to prevent rotation thereof with possible consequent entanglement of the motor power and signal cable.

DESCRIPTION OF THE PREFERRED EMBODIMENT

Figure 1:
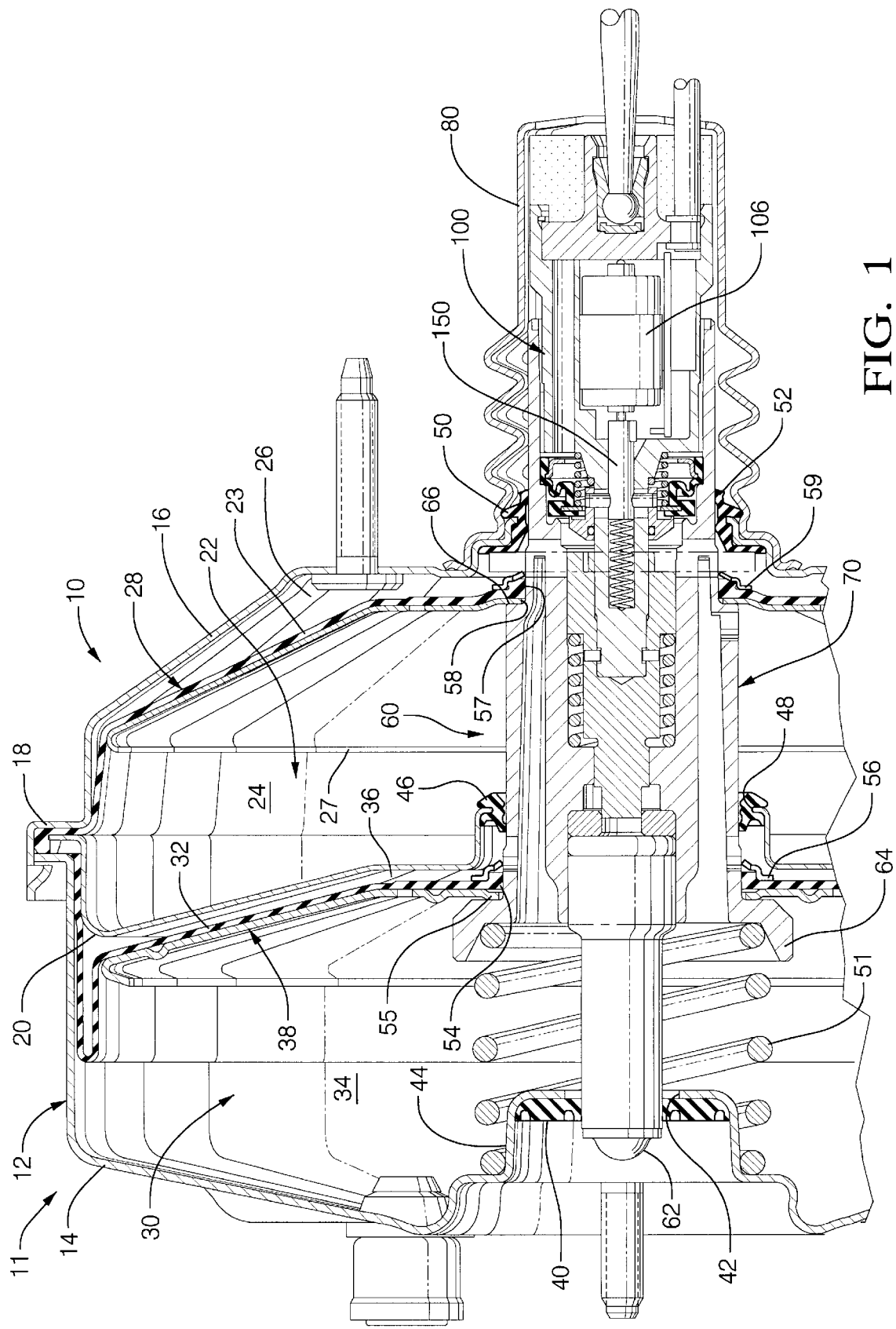
FIG. 1 is cutaway view of a preferred embodiment of the brake booster of this invention.

FIG. 1 shows a vacuum operated brake booster of the type used in hydraulic braking systems for power assisted braking. Booster 10 of FIG. 1 includes a differential pressure actuator 11 having a housing 12 formed from a front housing wall 14 and a rear housing wall 16 joined together peripherally at 18. A housing divider 20 divides housing 12 into a primary section 22 and a secondary section 30. A primary diaphragm 23 is sealingly secured peripherally at 18 between front housing wall 14 and rear housing wall 16 to divide primary section 22 into a vacuum chamber 24 and a working chamber 26 and is teamed with a diaphragm support plate 27 to form a primary power wall 28. A secondary diaphragm 32 is sealingly secured peripherally at 18 between front housing wall 14 and rear housing wall 16 to divide secondary section 30 into a constant pressure vacuum chamber 34 and a variable pressure working chamber 36 and is teamed with a diaphragm support plate 37 to form a secondary power wall 38. Vacuum chambers 24 and 34 communicate with each other and with a source of pressure lower than atmospheric pressure, such as engine manifold vacuum, in the normal manner. Working chambers 26 and 36 communicate with each other and with a source of working pressure, to be described, in the normal manner. Booster 10 is thus a tandem diaphragm booster, although the invention is equally applicable to single diaphragm boosters. The structure of case 12 and its elements described above is essentially as taught in the prior art.

Axial openings are provided, as taught by the prior art, through the elements of case 12 to accommodate a power piston/air valve assembly 60, which is axially movable through a limited range relative to case 12. Each of these openings is sealed to the outer periphery of power piston/air valve assembly 60 to preserve the integrity of vacuum chambers 24 and 34 and working chambers 26 and 36. For example, a seal element 40 in an opening 42 in a raised spring seat 44 of front housing wall 14 provides a sliding seal for an output rod 62 of power piston/air valve assembly 60. A seal element 46 in an opening 48 of housing divider 20 also provides a sliding seal to the outer periphery of power piston/air valve assembly 60, as does a seal element 50 in an axial opening 52 through rear housing member 16. An internal rim 54 defining an axial opening through secondary diaphragm 32 and an adjacent rim 55 defining an axial opening through diaphragm support plate 37 retained together against a radial flange 64 of power piston/air valve assembly 60 by a retaining element 56. Likewise, an internal rim 57 defining an axial opening through primary diaphragm 23 and an adjacent rim 58 defining an axial opening through diaphragm support plate 27 are retained together against a radial step 66 of power piston/air valve assembly 60 by a retaining element 59. Thus, both primary power wall 28 and secondary power wall 38 engage power piston/air valve assembly 60 in a manner that seals the power walls to the piston and permits the application of force in a leftward axial direction, in FIG. 1, to power piston/air valve assembly 60.

A return spring 51 is compressed between raised spring seat 44 of front housing wall 14 and a depressed spring seat in the side of radial flange 64 of power piston/air valve assembly 60 opposite secondary power wall 38 to apply a return force to power piston/air valve assembly 60 rightward in FIG. 1 in the normal manner. A push rod 68 received in the axial end of power piston/air valve assembly 60 opposite output member 62 provides driver input from a vehicle operated brake control device, not shown, to move power piston 62 in a leftward direction in FIG. 1, against the force of return spring 51, so that output member 62 bears on a master cylinder, not shown, in the normal manner, to increase hydraulic pressure in the vehicle brake lines and thus activate the wheel brakes. The force exerted by a vehicle operator on push rod 68 is increased by the power assist operation of booster 10 in normal operation; and a power braking output is also activatable independently of driver input through push rod 68.

Power piston/air valve assembly 60 comprises a power piston 70, which includes radial flange 64 at its output end and has a central axial opening 72. Opening 72 extends axially completely through power piston 70. Power piston 70 is generally similar to those of the prior art in structure and function. An air valve 100 is located generally within power piston 70, is axially aligned therewith and projects outward therefrom on the input side, to the right in FIG. 1. Air valve 100 is modified from similar air valves of the prior art to include the alternate, rotary motor driven actuating apparatus therein and, in this embodiment, is designed to directly replace a similar air valve of the prior art lacking such apparatus. It is one advantage of using the rotary motor driven actuating apparatus of this invention that such substitution is possible, although it is not necessary for the practice of the invention.

Figure 2:
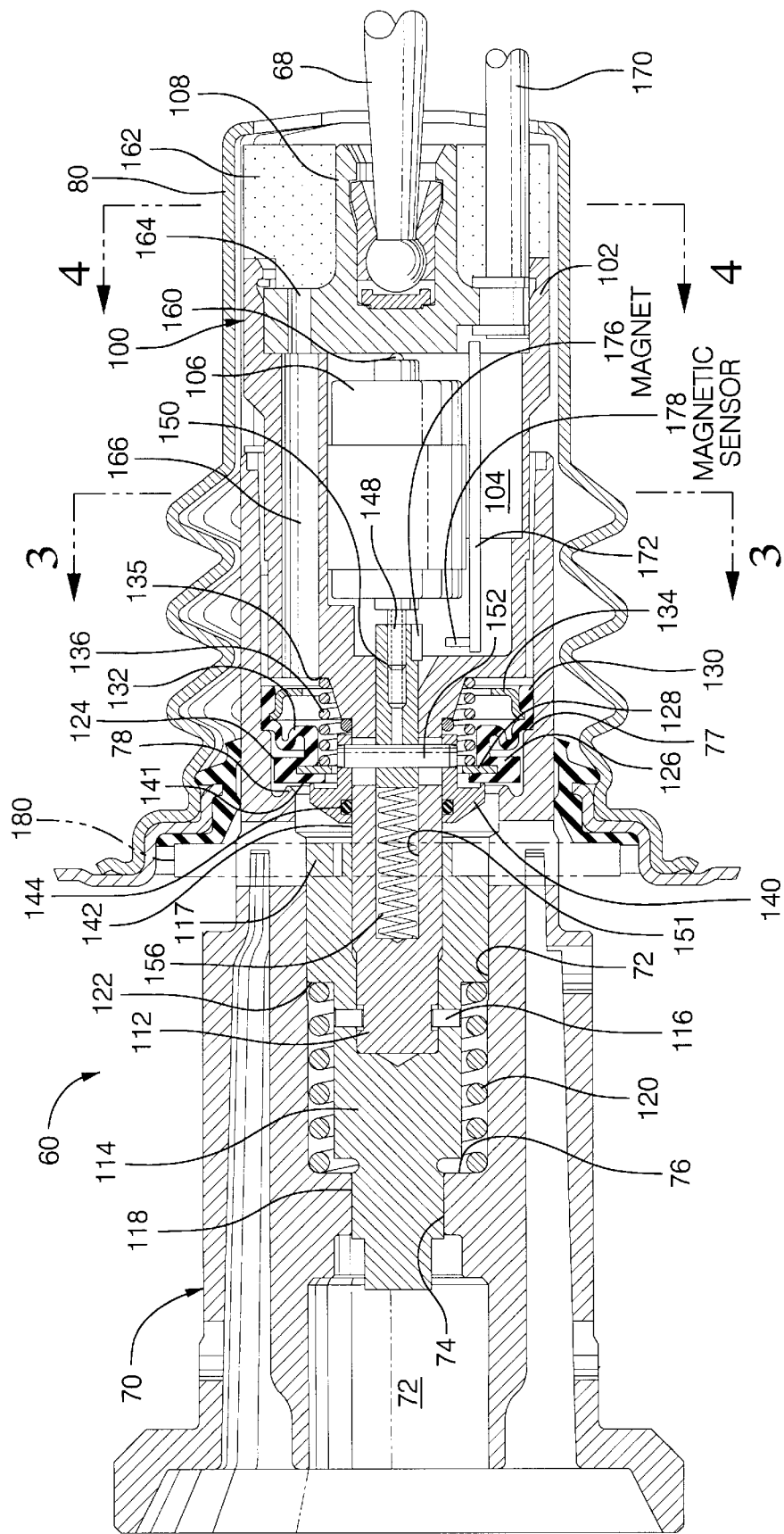
FIG. 2 is an enlargement of a portion of the view of FIG. 1.
Figure 3:
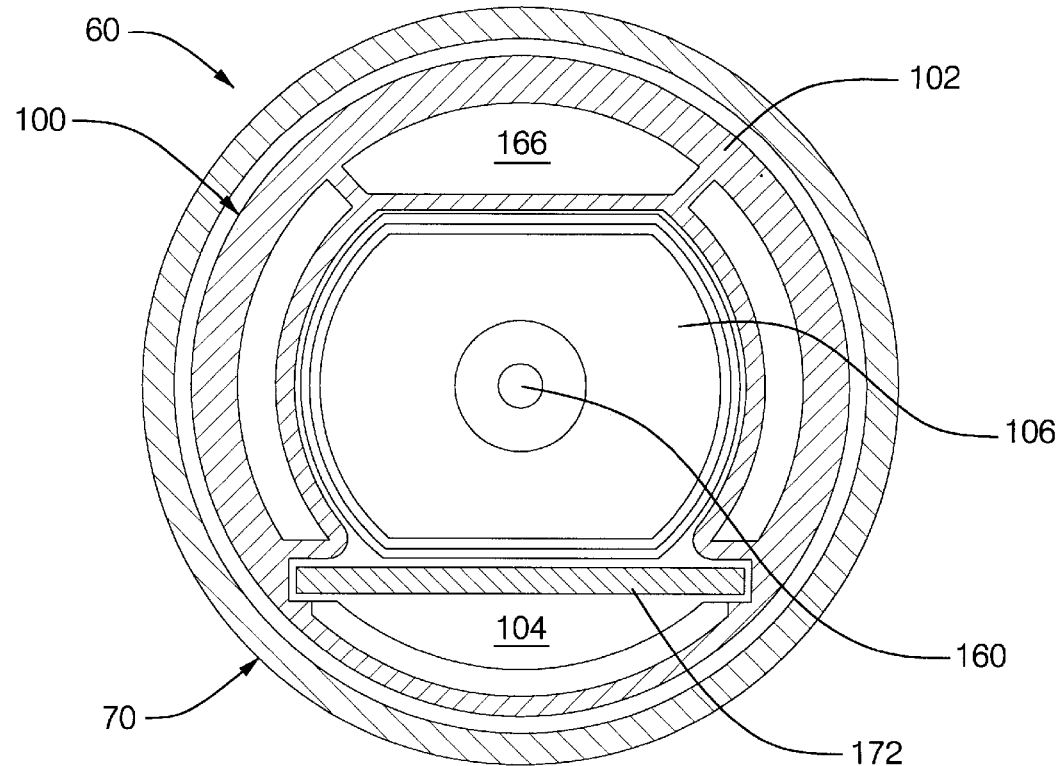
FIG. 3 is a section view along lines 3—3 of FIG. 2.
Figure 4:
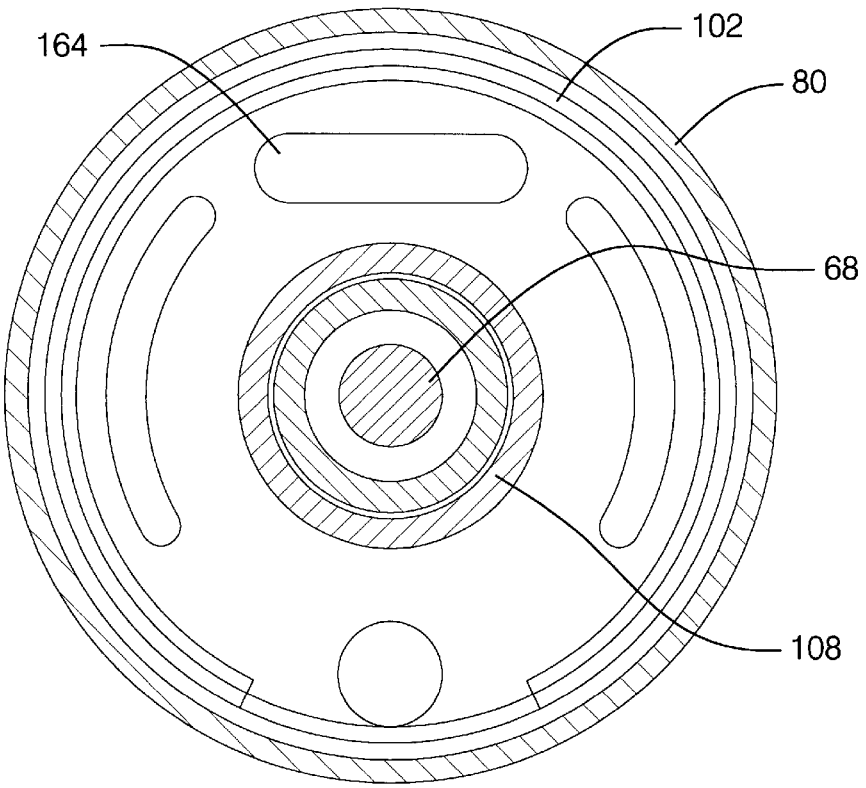
FIG. 4 is a section view along lines 4—4 of FIG. 2.

Power piston/air valve assembly 60 is shown enlarged in FIG. 2. Air valve, or input member, 100 is, in this embodiment, assembled from three pieces, although this is not required to practice the invention. An air valve body 102 defines a motor chamber 104 containing a rotary electric motor 106. The input end of chamber 104 is closed by a back plate 108 having a receptacle 110 for push rod 68, which provides a brake actuating signal when moved to the left in the Figure by an operator actuated brake pedal or other means in the normal manner. The opposite (left) end 112 of air valve body 102 has a smaller diameter and is received in an axial opening of an output extension member 114 and retained by stakes or pins 116. Thus, air valve body 102, back plate 108 and output extension member 114 together comprise the main part of air valve 100. A bearing surface 118 of output extension member 114 supports air valve 100 on an inner bearing surface 74 of power piston 70; and a return spring 120 is axially compressed between an internal step 76 in power piston 70 and an external step 122 of air valve 100.

A floating valve member 124 made of nibber or a similar material has a thick annular portion 126 reinforced with a metal washer 128 and an anchor portion 130 sealed against an internal step 77 of power piston 70 by an annular retainer 134. A thinner connecting portion 132 of floating valve member 124 is flexible and folded to permit axial movement of thick annular portion 126 relative to power piston 70. A spring 136, seated on a step 135 of air valve 100, biases thick annular portion 126 of floating valve member 124 to the left in the Figure in the direction of, and, in the absence of any interference, into engagement with, a low pressure valve seat 78 formed internally in power piston 70 in the normal manner.

A translating valve member 140 slides axially on an annular outer surface 142 of air valve 100; and a standard "O"-ring 144 retained in an inner annular groove of valve member 140 provides sealing therebetween. Translating valve member 140 defines a working pressure valve seat 141 that is essentially parallel with low pressure valve seat 78 and similarly axially engagable with floating valve member 124 in a manner similar to that of the prior art. But, unlike the prior art, translating valve member is axially movable with respect to air valve 100. An output shaft of rotary electric motor 106 is provided with screw threads to form an output screw 148 extending axially toward translating valve member 140. An axially extending nut 150 rides on screw 148 and is thus moved axially with motor activation. Screw 148 and nut 150 project from motor chamber 106 into an axial annular opening 151 within air valve 100 that connects with motor chamber 106. A drive pin 152 is retained in nut 150 for axial movement therewith and extends in opposite radial directions out of nut 150 to engage translating valve member 140. A slot 154 in air valve 100 allows a limited axial movement of drive pin 152 relative thereto; and thus activation of rotary electric motor 106 causes controlled axial movement of translating valve member 140 relative to air valve 100. Thus, the booster can be activated by rotary electric motor 106 independently of push rod 112 and therefore without action by the vehicle operator.

The input braking load from push rod 112 is carried through air valve 100 around motor 106 and its screw/nut output apparatus. Axial loads generated by the motor itself are applied to back plate 108 directly by a rounded end 160 of the motor shaft so as to relieve axial stress within the motor. An optional bias spring 156 within axial opening 151 provides a balancing force through nut 150 to the shaft of motor 106 to relieve axial stresses in the screw/nut apparatus. Spring 156 is not otherwise needed and could be eliminated if such loads are of no concern.

The right end, in the Figure, of assembly 60 is generally open to the atmosphere; and an air filter 162 cleans and silences incoming air. This air passes through one or more air passages such as opening 164 through back plate 108 and air passage 166 through air valve body 102 to the internal area of air valve 100 generally below and to the right of floating valve member 124. Sealing "O"-ring 144 is important in preventing this air at atmospheric pressure from leaking around translating valve member 140 between that member and surface 142. "O"-ring 144 is a simple and inexpensive solution to this seal requirement; but it is also high in friction and would be difficult to use with a booster having alternate actuation by a linear solenoid, which does not generate sufficient force to provide smooth operation with a high friction load. The rotary motor 106 and screw/nut drive of this invention, however, provides the output torque and mechanical advantage to positively drive translating valve member 140 axially with good control in spite of the high friction seal arrangement.

The operation of this apparatus in response to a driver initiated brake input is essentially the same as the prior art. The open volume between floating valve member 124 and power piston 70 is open to a low pressure source such as engine manifold vacuum; and the normal inactivated position of air valve 100 and translating valve member 140 pushes floating valve member 124 axially slightly away from low pressure valve seat to open the low pressure valve and provide low pressure fluid to the working chamber(s) of differential pressure actuator 11. Since the same low pressure fluid is provided to its other chamber(s), the differential pressure actuator is not actuated; and power piston 70 is thus maintained to the right in the Figures. Braking input through push rod 112 moves air valve 100 to the left in the Figures until floating valve member 124 engages low pressure valve seat 78 to close the low pressure valve. Further movement of air valve 100 to the left causes translating valve member 140, which moves with air valve 100 in this mode of operation, to disengage from floating valve member 124, which can move no further left. This opens the working pressure valve and allows air at atmospheric pressure to enter the working chamber of differential pressure actuator 11, which moves power piston 70 to the left with a force significantly greater than that provided by the vehicle operator. In the vehicle brake system, this boosted force is applied to the brake lines in the master cylinder, not shown, in the usual manner.

But as power piston 70 is moved to the left by differential pressure actuator 11, floating valve member 124 is also allowed to move to the left; and it engages translating valve member 140 to close the working pressure valve and stop the further increase in fluid pressure in the working chamber. Likewise, reduction of braking input by the vehicle operator causes the air valve to move back to the right; and this generally causes translating valve 140 to push floating valve 124 to the right, out of engagement with low pressure seat 78, to open the low pressure valve. Air is then evacuated from the working pressure chamber to move power piston to the right and reduce fluid pressure in the vehicle brake lines. Thus, differential pressure actuator 11 is controlled by the air valve to provide boosted braking pressure in response to vehicle operator braking input.

In the apparatus of this invention, the booster can be activated by an electrical signal independently of drive input. An input electrical signal, as well as electric power, is provided to the booster through a connecting cable 170 to electronic motor control elements, not shown, on a circuit board 172 supported along with motor 106 within motor chamber 104. Activation of motor 106 results in rotation of the output shaft screw 148, which causes nut 150 to move axially, to the left in FIG. 2. Drive pin 152 moves with nut 150 and causes translating valve member 140 to move left. Movement of translating valve member 140 due to activation of electric motor 106, without movement of air valve 100, produces exactly the same effect in the valve apparatus as if translating valve member 140 had been carried the same distance by movement of air valve 100. Floating valve member 124 is allowed to engage low pressure valve seat 78; and, with further movement, working pressure valve seat 141 disengages from floating valve member 124 to activate differential pressure actuator 11, with power piston 71) being moved in the brake increasing direction (left) until working pressure seat 141 once again engages floating valve member 124. Activation of electric motor 106 in the reverse direction produces the opposite result, as with decrease of driver initiated braking as described above.

It should be noted that a vehicle operator may always override the electrical activation of the booster in the brake apply direction. Specifically, if additional brake input from push rod 112 is sufficient to move air valve 100 in the brake apply direction, air valve 100 will carry translating valve member 140 with it, regardless of their motor determined positional relationship.

Figure 5:
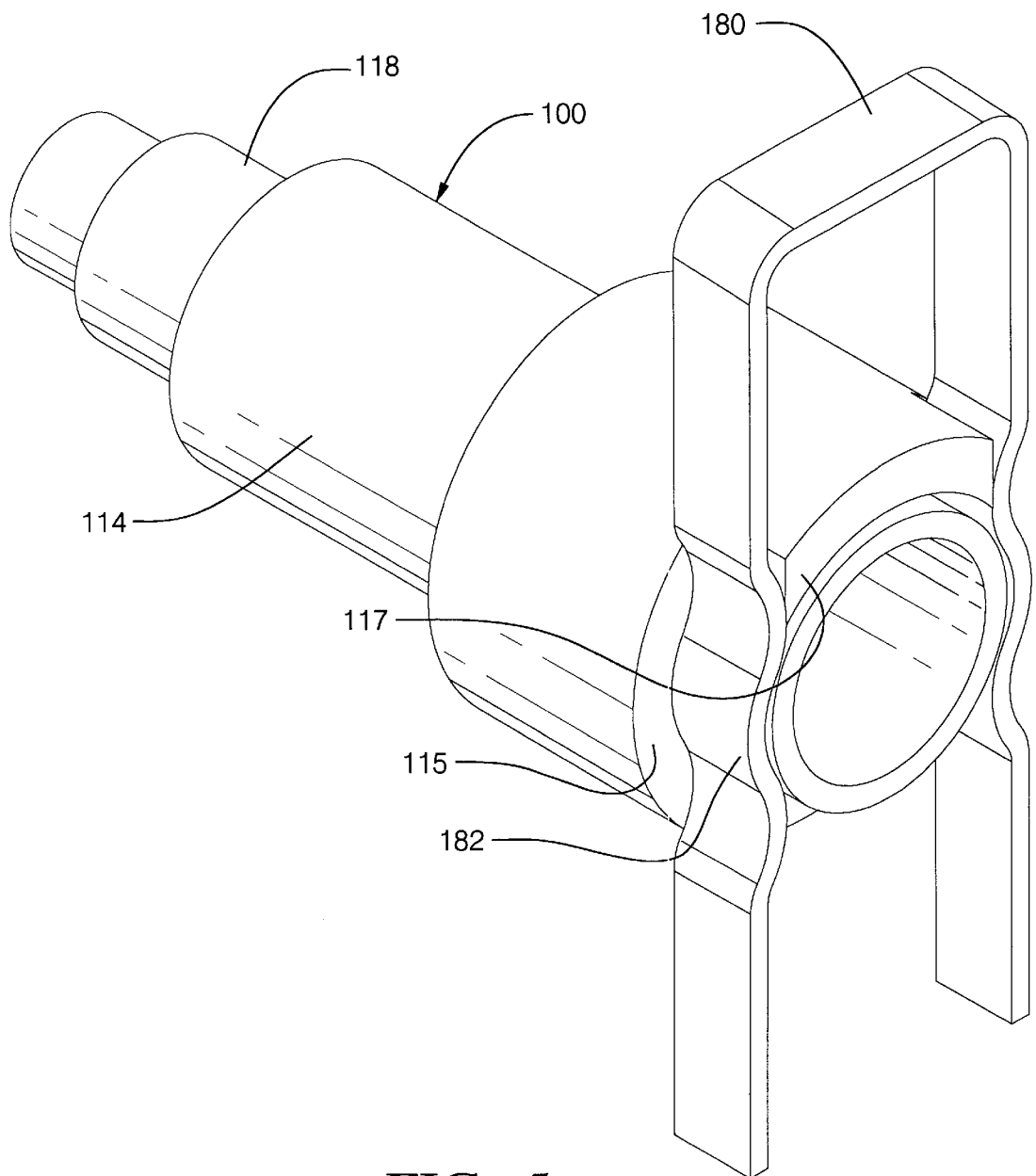
FIG. 5 is a perspective view of a portion of the booster of FIGS. 1–4 illustrating an anti-rotation arrangement for the air valve.

Due to the presence of electric cable 170 projecting from the input axial end of air valve 100, it is desirable to prevent rotation of the air valve. FIG. 5 shows a structural arrangement to prevent such rotation. The Figure shows output extension member 114 of air valve 100, together with a retaining clip 180 used in a standard arrangement to retain air valve 100 within power piston 70 when assembly of the two members is complete. Clip 180 is also shown from the side in phantom view in FIG. 2. The input end of output extension member 114, to the right in the FIG. 2 and 5, is cut back axially to form a radial indentation to receive arms 182 of retaining clip 180 against an axial end surface 115 when the clip is crimped inward. Clip 180 is axially locked in power piston 70 in a standard manner, not shown, and thus prevents the axial withdrawal of air valve 100 from power piston 70. In this embodiment, one portion 117 of the input end of output extension member 114 extends between arms 182 of retaining clip 180 and engages arms 182 with attempted rotation of air valve 100 so as to prevent such rotation.

A sensor for the relative position of translating valve member 140 may be provided as shown in FIG. 2. A magnet 176 is mounted on the end of nut 150 for axial movement with the nut, and thus with translating valve member 140. A magnetic sensor 178, such as a Hall Effect sensor, is mounted on circuit board 172 adjacent magnet 176 so as to be responsive to the strength of the magnet generated magnetic field. The output signal thus generated indicates the axial position of translating valve member 140 relative to air valve 100. This signal may be used by the electronic elements on circuit board 172 in a position control loop or any other control requiring the position information. For example, the signal would be useful in ensuring the consistent and accurate return of translating valve member 140 to a predetermined initial or deactivated position when alternate electric activation is finished, so as to consistently provide predetermined booster characteristics in standard, vehicle operator initiated activation.

Although motor 106 is shown in this embodiment as being on the input side of valve member 141, it could with a few design changes alternatively be placed on the opposite side, with the output shaft extending to the right in FIG. 1 and 2. But the design shown herein is preferred, at least partly because the power and signal cable (170) to the motor is more conveniently routed out the end of the unit.

What is claimed is:

1. In a brake booster comprising:

a differential pressure actuator having a working chamber and an output member;

a power piston fixed to the output member and having a low pressure valve seat;

an input member within the power piston, axially movable with respect thereto and carrying a translating valve member having a working pressure valve seat;

a control valve member axially movable with respect to, biased toward, and engageable with both the low pressure valve seat and the working pressure valve seat so that at least one of the low pressure valve seat and the working pressure valve seat is engaged with the control valve member at all times, the control valve member opening the working chamber to a low pressure fluid passage for deactivation of the differential pressure actuator when disengaged from the low pressure valve seat and opening the working chamber to a working pressure fluid passage for activation of the differential pressure actuator when disengaged from the working pressure valve seat, the input member being moved with braking input in an axial direction to disengage the control valve member from the working pressure valve seat and thus actuate the differential pressure actuator and the power piston being moved by the output member with activation of the differential pressure actuator in an axial direction to move a booster output rod with a boosted force and to disengage the low pressure valve seat from the control member;

the improvement comprising:

a rotary electric motor within the brake booster, the rotary electric motor being carried on the input member and having an axial output shaft;

the translating valve member being axially movable with respect to the input member; and rotary to linear motion conversion apparatus linking the output shaft of the rotary electric motor to the translating valve member so that rotary motion of the output shaft produces linear axial motion of the translating valve members relative to the input member, when the rotary electric motor is activated.

2. The brake booster of claim 1 in which the improvement further comprises:

the rotary to linear motion conversion apparatus comprises a screw on the output shaft of the rotary electric motor, an axial nut engaged with the screw for axial movement with rotation of the screw and a radial drive pin engaging the nut with the translating valve member for mutual axial motion.

3. The brake booster of claim 2 in which the improvement further comprises:

an axial, annular outer surface on the input member, the translating valve member being axially slidable thereon;

a central axial opening in the input member, the rotary electric motor being supported therein with its output shaft, the screw and the nut projecting axially therefrom radially within the axial annular outer surface; and a radial slot through the input member and the axial annular surface, the radial drive pin extending radially from the nut through the radial slot past the axial annular surface to engage the translating valve member, the radial slot allowing axial motion of the drive pin.

4. The brake booster of claim 2 in which the improvement further comprises:

the translating valve member slides axially on an outer annular bearing surface of input member and includes a groove facing the outer annular bearing surface; and an "O"-ring seal in the groove engaging the translating valve member and the outer annular surface of the input member to prevent leakage of fluid around the working pressure valve seat when the latter engages the control valve member.

5. The brake boost claim 1 in which the input member is axially retained in the power piston by a clip having a pair parallel arms each engaging the input member and the power piston axially to limit mutual axial movement thereof and improvement further comprises an extension of a portion of the input member between the parallel arms to engage the arms circumferentially with attempted rotation of the input member and thus prevent such rotation.

6. The brake booster of claim 1 in which the improvement further comprises:

a magnet mounted on a linearly moving portion of the rotary to linear motion conversion apparatus so as to move with the working pressure valve seat;

a magnetic sensor mounted adjacent the magnet but stationary with respect to the input member, the magnetic sensor being responsive to the magnetic field of the magnet to generate a signal indicating the axial position of the working pressure valve seat relative to the input member.

* * * * *